US011401113B2

(12) United States Patent
Polak et al.

(10) Patent No.: US 11,401,113 B2
(45) Date of Patent: Aug. 2, 2022

(54) MONITORING A TRANSVERSE POSITION OF A CONVEYOR BELT AND ITS MATERIAL LOAD BY DIGITAL IMAGE ANALYSIS

(71) Applicant: SYNCRUDE CANADA LTD. in trust for the owners of the Syncrude Project as such owners exist now and in the future, Calgary (CA)

(72) Inventors: Mark Polak, Edmonton (CA); Michael Carniato, Sherwood Park (CA)

(73) Assignee: SYNCRUDE CANADA LTD. IN TRUST FOR THE OWNERS OF, Calgary (CA)

( * ) Notice: Subject to any disclaimer, the term of this patent is extended or adjusted under 35 U.S.C. 154(b) by 161 days.

(21) Appl. No.: 16/925,840

(22) Filed: Jul. 10, 2020

(65) Prior Publication Data

US 2021/0009359 A1    Jan. 14, 2021

Related U.S. Application Data

(60) Provisional application No. 62/872,997, filed on Jul. 11, 2019.

(51) Int. Cl.
*B65G 43/06* (2006.01)
*G06T 7/13* (2017.01)
(Continued)

(52) U.S. Cl.
CPC ............ *B65G 43/02* (2013.01); *G06T 7/0004* (2013.01); *G06T 7/11* (2017.01); *G06T 7/13* (2017.01);
(Continued)

(58) Field of Classification Search
CPC ........... B65G 43/02; B65G 46/06; G06T 7/11; G06T 7/13
(Continued)

(56) References Cited

U.S. PATENT DOCUMENTS 6,032,787 A    3/2000 Kellis
6,988,610 B2 *    1/2006 Fromme ............... G06T 7/0004
198/810.02
(Continued)

FOREIGN PATENT DOCUMENTS

CA    3039866 A1    10/2019

OTHER PUBLICATIONS

Pang, Y., 2010, "Intelligent Belt Conveyor Monitoring and Control", M.Sc. in Electrical Engineering thesis, Taiyuan University of Technology, China.
(Continued)

*Primary Examiner* — Douglas A Hess
(74) *Attorney, Agent, or Firm* — Bennett Jones LLP

(57) ABSTRACT

A method, system and computer program product are provided for monitoring a transverse position of a conveyor belt or its material load. A processor receives a digital video or digital images capturing movement of the conveyor belt and the material load. The processor segments the images or frames into a group of contiguous pixels representative of the conveyor belt, and the material load, such as by moving object detection, using background segmentation and threshold processing, pixel intensity-based segmentation or image texture-based segmentation. The processor determines a pixel coordinate of the group of contiguous pixels, which is indicative of the transverse position of the conveyor belt or the material load. The processor generates an alarm or report or a data signal, which depends, directly or indirectly, on the determined pixel coordinates.

13 Claims, 7 Drawing Sheets

(51) Int. Cl.
  *B65G 43/02* (2006.01)
  *G06T 7/254* (2017.01)
  *G06T 7/11* (2017.01)
  *G06T 7/00* (2017.01)
  *B65G 15/00* (2006.01)

(52) U.S. Cl.
  CPC .............. *G06T 7/254* (2017.01); *B65G 15/00* (2013.01); *B65G 2203/0233* (2013.01); *B65G 2203/0283* (2013.01); *B65G 2203/041* (2013.01); *G06T 2207/10016* (2013.01); *G06T 2207/30108* (2013.01)

(58) Field of Classification Search
  USPC .............................................. 198/502.3, 617
  See application file for complete search history.

(56) References Cited

U.S. PATENT DOCUMENTS

| | | | |
|---|---|---|---|
| 7,894,934 B2 | 2/2011 | Wallace et al. | |
| 8,657,105 B2 | 2/2014 | Twigger et al. | |
| 8,755,589 B2* | 6/2014 | Sobczak | G06T 7/12 |
| | | | 382/152 |
| 9,227,793 B2 | 1/2016 | Rathmann et al. | |
| 9,605,950 B2* | 3/2017 | Wolff | G06T 7/74 |
| 10,043,258 B2 | 8/2018 | Salibury et al. | |
| 10,471,478 B2* | 11/2019 | Gil | B65G 15/30 |
| 10,843,875 B2* | 11/2020 | Smith | B65G 23/44 |
| 10,882,701 B2* | 1/2021 | Muehlberger | B65G 43/08 |
| 11,155,416 B2* | 10/2021 | Murphy, Jr. | B65G 15/54 |
| 2003/0168317 A1 | 9/2003 | Fromme et al. | |
| 2019/0322460 A1 | 10/2019 | Carniato et al. | |

OTHER PUBLICATIONS

Fei Zeng, Qing Wu, Xiuming Chu, Zhangsi Yue, Nov. 2015, in "Measurement of bulk material flow based on laser scanning technology for the energy efficiency improvement of belt conveyors.", Measurement, vol. 75, pp. 230-243.

The CantyVision™ system (JM Canty, Inc.; Buffalo, New York USA) https://www.jmcanty.com/product/vision-based-volume-measurement/.

The Flow Checker™ system (RHEWUM GmbH; Germany) https://www.rhewum.com/en/products/optical-systems/rhewum-flowchecker-en.html.

The VMS3000™ system (Jansen & Heuning; Netherlands) https://www.jh.nl/en/product/volumemeetsysteem-vsm300/.

The Eagle Eye™ system (Fenner Dunlop; Australia) https://www.fennerdunlop.com.au/conveyor-products/conveyor-diagnostic/eagle-eye-belt-monitoring-rip-detection.

The Model TA™ system (Electro Sensors Inc.; Minnetonka, Minnesota, USA).

* cited by examiner

MONITORING A TRANSVERSE POSITION OF A CONVEYOR BELT AND ITS MATERIAL LOAD BY DIGITAL IMAGE ANALYSIS

FIELD OF THE INVENTION

The present invention relates to computer-implemented methods, systems, and computer program products for monitoring a transverse position of a conveyor belt and its material load by digital image analysis and computer vision techniques.

BACKGROUND OF THE INVENTION

A conveyor belt system may be used to move material in a variety of industrial processes. For example, a conveyor belt may be used to move crushed oil sand ore to slurry processing equipment.

The prior art includes a variety of technologies for monitoring conveyor belt systems.

Pang, Y., 2010, "Intelligent Belt Conveyor Monitoring and Control", M.Sc. in Electrical Engineering thesis, Taiyuan University of Technology, China, summarizes different conveyor belt monitoring technologies.

U.S. Pat. No. 7,894,934 B2 (Wallace et al.; 2011-02-22) discloses a system for monitoring a conveyor belt, that includes a variety of sensors: a laser measurement transmitter for measuring belt thickness; a temperature sensor; a belt volume scanner to estimate the weight of material on the conveyor; a belt scan sensor (e.g., an X-ray scanner) to monitor the quality of the conveyor belt; a camera to observe the conveyor belt; a motor energy sensor, and a belt tension sensor.

Some technologies measure the amount of material on the conveyor belt using cameras or lasers.

The CantyVision™ system (JM Canty, Inc.; Buffalo, N.Y. USA) uses a camera to analyze a material profile on a conveyor belt to produce an integrated material volume.

The Flow Checker™ system (RHEWUM GmbH; Germany) uses a 3D time-of-flight (TOF) range imaging camera to calculate mass flow of product placed on top of a conveyor belt, and to detect undesired accumulation of product.

The VMS3000™ system (Jansen & Heuning; Netherlands) uses a laser beam projected on a material on a conveyor belt, and a camera to read the projection, to determine the volume of material on the conveyor belt.

The Volis™ system (DataVision s.r.o.; Czech Republic) is an optical control system that uses a laser scanner to measure the volume of loose material on the conveyor belt.

Fei Zeng, Qing Wu, Xiuming Chu, Zhangsi Yue, November 2015, in "Measurement of bulk material flow based on laser scanning technology for the energy efficiency improvement of belt conveyors.", Measurement, Volume 75, Pages 230-243 describes a technique for measuring material flow on a conveyor belt using laser scanning.

Some technologies monitor the physical condition of the conveyor belt.

The CBM Beltspy™ (CBMI; Australia) uses machine vision technology to detect joins, or damaged conveyor belt surfaces and belt edges.

The CBGuard™ (CBMI; Australia) uses X-ray technology to detect abnormalities in the belt structure.

The Eagle Eye™ system (Fenner Dunlop; Australia) measures magnet flux leakage to detect belt damage.

U.S. Pat. No. 6,032,787 (Kellis; 2000 Mar. 7) describes a system and method for monitoring the condition of the belt which employs a signal emitter and a signal receiver on opposite sides of the belt, such that the signal receiver receives the signal through a damaged portion of the belt.

U.S. Pat. No. 8,657,105 B2 (Twigger et al.; 2014 Feb. 25) discloses a system and method for controlling a conveyor belt condition monitoring system, in which sensors measure magnetic disruptions in belt components, and the disruptions are monitored to predict failure of the belt.

U.S. Pat. No. 9,227,793 (Rathmann et al.; 2016 Jan. 5) discloses a system and method for monitoring a condition of a conveyor belt, in which a sensor unit determines a sensor signal representing an operating variable of an electrical motor, detects irregularities in the signal, and determines a condition of the conveyor belt based on the irregularities.

U.S. Pat. No. 10,043,258 B2 (Salibury et al.; 2018 Aug. 7) discloses a conveyor belt monitoring system and method, in which an infrared line scanner scans the conveyor belt to generate thermal image data to identify temperature anomalies in the material travelling on the surface of the conveyor belt.

However, the foregoing technologies do not directly address two particular problems associated with conveyor belt operation. The first problem is transverse misalignment of the conveyor belt relative to its supporting pulleys and the rollers—that is, undesired movement of the belt in the direction perpendicular to the intended longitudinal travel direction of the belt. Such misalignment may accelerate wear of the belt, and lead to damage to other components of the conveyor belt system.

The Model TA™ system (Electro Sensors Inc.; Minnetonka, Minn., USA) monitors conveyor belt misalignment by the use of pivoting roller arms on each side of the conveyor belt that intercepts the conveyor belt when the belt becomes misaligned, and actuates contact switches. However, components of the system that contact the conveyor belt or are near the conveyor belt are susceptible to wear and damage, especially when used in a heavy industrial environment. Also, such systems are able only to provide a discrete notification of misalignment when the misalignment is sufficient to actuate the contact switches between its binary "on" or "off" states.

The second problem is material being loaded transversely too close to the edge of the conveyor belt. This can result in uneven load distribution across the width of the belt, which contributes to the belt misalignment. This can also result in the material spilling off the sides of the belt, and fouling the conveyor belt mechanisms, which leads to jams, overheating, and breakdown of the mechanisms. To the inventors' knowledge, no technologies exist for detecting the transverse position of the loaded material.

Accordingly, a need remains in the art for technological solutions to a monitor the transverse position of a conveyor belt and its material load. Preferably, such technologies do not rely on contact mechanisms with the conveyor belt. Preferably, such technologies allow for continuous, verifiable, and quantitative monitoring. Preferably, such technologies are computationally efficient and practical to implement.

SUMMARY OF THE INVENTION

In one aspect, the present invention comprises a method for monitoring a transverse position of a conveyor belt. The method is implemented by a processor and comprises the steps of:

(a) receiving at least one digital image of at least a portion of the conveyor belt;
(b) for each digital image:
   (i) segmenting the digital image into a group of contiguous pixels representative of at least the portion of the conveyor belt; and
   (ii) determining a pixel coordinate indicative of the transverse position of the conveyor belt, based on the group of contiguous pixels; and
(c) generating either an alarm or report that is audible or visible to a human, or a data signal, wherein generation of the alarm, the report or the data signal, or a characteristic of the generated alarm, report or data signal depends, directly or indirectly, on the determined pixel coordinates.

In one embodiment of the method, the receiving step (a) comprises receiving a time sequenced succession of digital images or digital video frames, and the segmenting step (b)(i) comprises performing moving object detection on the frame to differentiate the pixels representative of at least the portion the conveyor belt from other pixels of the frame, based on apparent motion of at least the portion of the conveyor belt between successive digital images or digital video frames. The moving object detection may comprise background subtraction. The segmenting step (b)(i) may further comprise performing threshold processing on the digital image or digital video frame after the moving object detection.

In one embodiment of the method, the segmenting step (b)(i) comprises one or a combination of pixel intensity-based segmentation, or image texture-based segmentation.

In one embodiment of the method, step (b) further comprises determining a pixel distance or an actual distance between an edge of the conveyor belt and a reference point, based on the determined pixel coordinate.

In another aspect, the present invention comprises a method for monitoring a transverse position of a material load on a conveyor belt. The method is implemented by a processor and comprises the steps of:
(d) receiving at least one digital image of the conveyor belt and the material load on the conveyor belt;
(e) for each digital image:
   (i) segmenting the digital image into a group of contiguous pixels representative of the material load; and
   (ii) determining a pixel coordinate indicative of the transverse position of the material load, based on the group of contiguous pixels; and
(f) generating either an alarm or report that is audible or visible to a human, or a data signal, wherein generation of the alarm, the report or the data signal, or a characteristic of the generated alarm, report or data signal depends, directly or indirectly, on the determined pixel coordinates.

In one embodiment of the method, the receiving step (a) comprises receiving a time sequenced succession of digital images or digital video frames, and the segmenting step comprises performing moving object detection on the digital image or digital video frames to differentiate the pixels representative of the material load from other pixels of the frame, based on apparent motion of the material load between successive digital images or digital video frames of the digital video. The moving object detection may comprise background subtraction. The segmenting step (b)(i) may further comprise performing threshold processing on the frame after the moving object detection.

In one embodiment of the method, the segmenting step (b)(i) comprises one or a combination of pixel intensity-based segmentation, or image texture-based segmentation.

In one embodiment of the method, step (b) further comprises determining a pixel distance or an actual distance between the material load and an edge of the conveyor belt, based on the determined pixel coordinate.

In another aspect, the present invention comprises a system comprising a processor operatively connected to a non-transitory tangible medium storing a set of instructions executable by the processor to implement one or a combination of the embodiments of the methods of the present invention, as described above.

In another aspect, the present invention comprises a computer program product comprising a non-transitory tangible medium storing a set of instructions executable by a processor to implement one or a combination of the embodiments of the methods of the present invention, as described above.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION OF EMBODIMENTS OF THE INVENTION

Definitions

Figure 1:
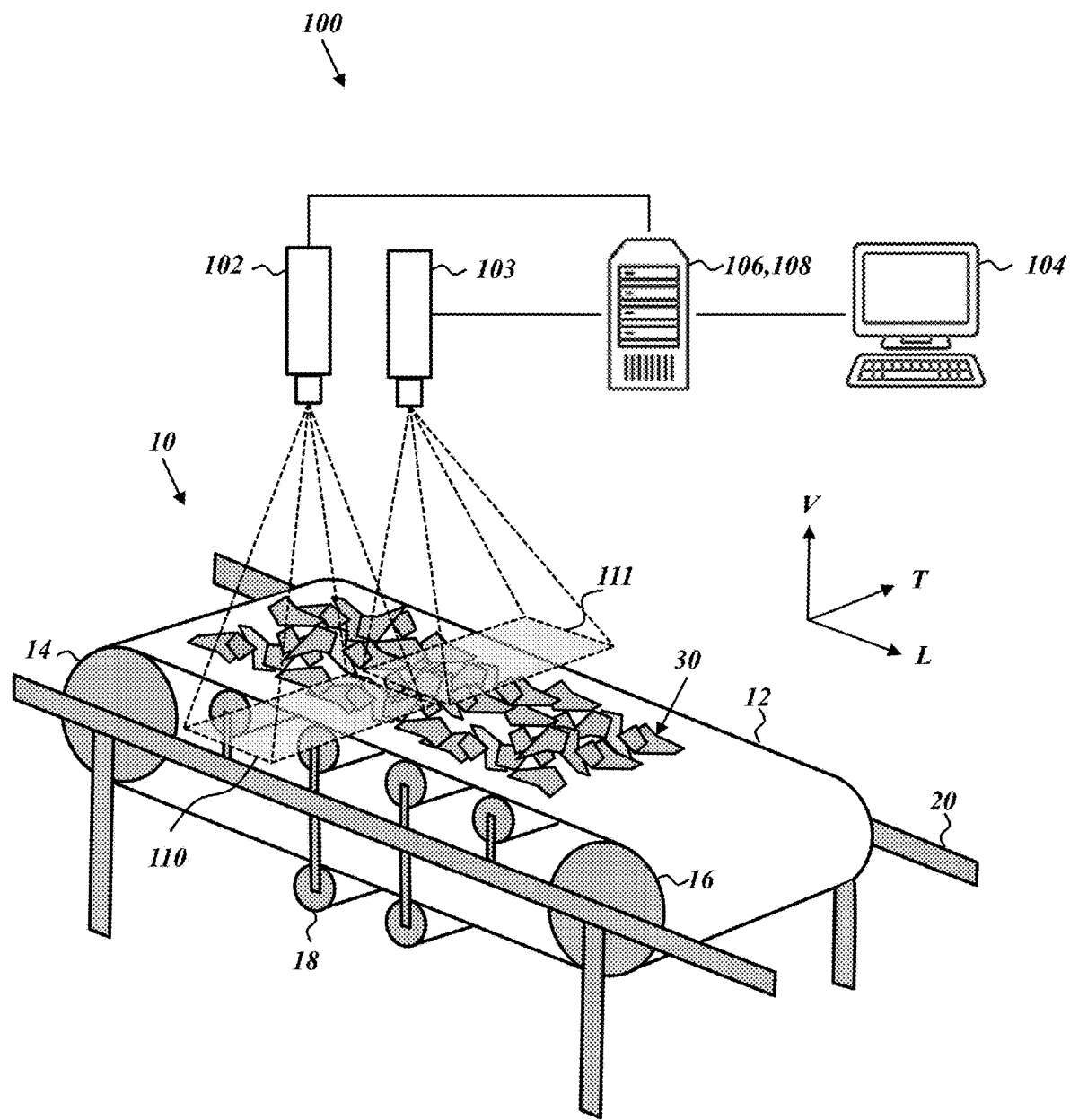
FIG. 1 shows a pictorial representation of an embodiment of a system of the present invention for monitoring a conveyor belt system.

Any term or expression not expressly defined herein shall have its commonly accepted definition understood by a person skilled in the art. As used herein, the following terms have the following meanings.

"Background subtraction" refers to a method for differentiating between objects that appear to move from a reference digital video frame to a subsequent digital video frame by determination of a difference in the pixel values between the reference frame and the subsequent frame, and determination of whether the difference exceeds a threshold value. Background subtraction may be performed in accordance with a variety of algorithms, which are known to persons skilled in the art of digital image processing, and which do not by themselves constitute the present invention.

"Digital camera" refers to any electronic device capable of capturing a digital image, and includes a digital video camera.

"Digital image" refers to data stored in a memory or transmittable in a data signal that provides a representation of an image as a two-dimensional array of pixels. As known to persons skilled in the art of digital image processing, each pixel is associated with a numerical value that represents the color of the pixel. Digital image data may be stored in a variety of known file formats including, without limitation, BMP, JPEG, PNG, RAW, or TIFF.

"Digital video" refers to a time-sequenced series of digital images, each of which is referred to as a "frame". Digital video data may be stored in a variety of known file formats including, without limitation, Audio Video Interleave (AVI), Flash Video (FLV), MPEG (MPG), QuickTime (MOV), and Windows Media Video (WMV).

"Digital video camera" refers to any electronic device capable of capturing digital video.

"Display device" refers to any electronic device capable of displaying a signal from a processor in human readable form. Non-limiting examples of display devices include LED (light emitting diode), LCD (liquid-crystal display), or CRT (cathode ray tube) video displays.

"Longitudinal", in describing a spatial relationship in reference to a conveyor belt, refers to the primary direction of travel of a conveyor belt in a conveyor belt system. The longitudinal direction is parallel to the length of the conveyor belt and perpendicular to the axes of rotation of it supporting pulleys.

"Moving object detection" refers to any technique to determine if any moving objects are detected within consecutive image frames. Some common methods include background subtraction, frame differencing, and Optical Flow, as known to persons skilled in the art of digital image processing, and which do not by themselves constitute the present invention.

"Memory" refers to a non-transitory tangible medium for storing information in a format readable by a processor, and/or instructions readable by a processor to implement an algorithm. Non-limiting types of memory include solid-state, optical, and magnetic computer readable media.

"Optical flow" (also known as "optic flow") refers to a method for detecting the apparent movement of a visual element between successive frames of a digital video. In general, optical flow involves determining a displacement vector for a particular pixel in one frame of a digital video to represent its apparent change of position in a successive frame of the digital video. Optical flow may be performed in accordance with a variety of algorithms, which are known to persons skilled in the art of digital image processing, and which do not by themselves constitute the present invention.

"Processor" refers to one or more electronic devices that is/are capable of reading and executing instructions stored on a memory to perform operations on data, which may be stored on a memory or provided in a data signal. Non-limiting examples of processors include devices referred to as microprocessors, microcontrollers, central processing units (CPU), and digital signal processors.

"Quantitative relationship" refers to a relationship, which can be used by a processor, to determine a numerical value of a variable based on a numerical value of at least one other variable. Non-limiting forms of quantitative relationships include a mathematical function, a data point set (e.g., in the form of a lookup table or associative array), or a best-fit curve applied to a data point set. Irrespective of the form of the quantitative relationship, a quantitative relationship to determine the numeric value of a variable, $\beta$, based on numerical values of variables $(\alpha_1, \alpha_2, \ldots \alpha_n)$, may be symbolically represented herein by the notation: $\beta=f(\alpha_1, \alpha_2, \ldots \alpha_n)$. The present invention is not limited by the manner in which a quantitative relationship is determined. For example, a quantitative relationship may be based on either one or a combination of a rational model according to theory, and empirical data.

"Transverse", in describing a spatial relationship in reference to a conveyor belt, refers to the horizontal direction perpendicular to the primary direction of travel of a conveyor belt. The transverse direction is perpendicular to the length of the conveyor belt and parallel to the axes of rotation of it supporting pulleys.

"Segmentation" refers to a method for partitioning a digital image into groups of pixels representing one or more discrete objects. In general, segmentation involves assigning a common label or classification to pixels sharing one or more common characteristic, such as color, luminous intensity, or perceived texture. Segmentation may be performed in accordance with a variety of algorithms (e.g., thresholding methods, clustering methods, statistical-based methods, or trainable machine learning methods implementing artificial neural networks), which are known to persons skilled in the art of digital image processing, and which do not by themselves constitute the present invention.

"Thresholding" refers to a method of converting pixels of a digital image from an original color value or luminous intensity to one of a limited set of possible color values or luminous intensities (e.g., black or white), depending on whether the original color or luminous intensity is less than or greater than a threshold value. Thresholding may be performed in accordance with a variety of algorithms, which are known to persons skilled in the art of digital image processing, and which do not by themselves constitute the present invention.

System.

FIG. 1 shows a conveyor belt system (10) as known in the art, and a system (100) of the present invention for monitoring the transverse alignment of the conveyor belt (12) and the transverse position of a material load (30) on the conveyor belt (12). The system may include external lights (not shown) if required for night-time operation.

In this embodiment, the conveyor belt system (10) is used to transport a material load (30) comprising crushed oil sand ore, but the system (100) is not limited by any particular use, size, or configuration of the conveyor belt system (10). The conveyor belt system (10) includes a conveyor belt (12) looped around an idler pulley (14) and a drive pulley (16), and supported by a plurality of idler rollers (18) below both the upper forward path and the lower return path of the conveyor belt (12). The pulleys (14, 16) and the rollers (18) are mounted for rotation on a stationary support structure (20). A motor (not shown) drives rotation of the drive pulley (16) such that the conveyor belt (12) travels primarily in a longitudinal direction (L). During use, however, the conveyor belt (12) may also travel in relatively smaller amounts in the transverse direction (T) perpendicular to the longitudinal direction (L), relative to the support structure (20). This transverse movement may be attributable to a variety of factors including, without limitation, uneven weight distribution of the material load (30) across the conveyor belt (12) in the transverse direction (T), impact of the material load (30) on the conveyor belt (12), improper tensioning of the conveyor belt (12), damage to the conveyor belt (12), and misalignment, wear, or damage of the pulleys (14, 16) and the rollers (18).

In this embodiment, the system (100) includes at least one digital video camera (102), a display device (104), a processor (106), a communication port (107), and a memory (108), which are subsequently described in further detail. The lines between the components of the system (100) show operative connections permitting data communication between them, whether such connections are in the form of a wired or wireless data signals (e.g., hardwired connections, a local area network, the Internet), or via memory devices (e.g., a memory card). The present invention is not limited by the manner in which the components of the system (100) are operatively connected. In one embodiment, one or more of the digital video camera (102), the processor (106), the communication port (107), the memory (108), and the display device (104), may be physically integrated. In alternative embodiments, one or more of the digital video camera (102), the display device (104), the processor (106), the communication port (107), and the memory (108), may be physically discrete devices, which may be situated either proximal to or remotely from the conveyor belt system (10). For example, the digital video camera (102) and the display device (104) may be separate from and in communication with the processor (106) and the memory (108) in a client server-relationship.

Digital Video Camera.

A purpose of the digital video camera (102) is to capture digital video of edge of the conveyor belt (12) and the material load (30) on the conveyor belt (12), while the conveyor belt (12) travels in the longitudinal direction (L).

Figure 2:
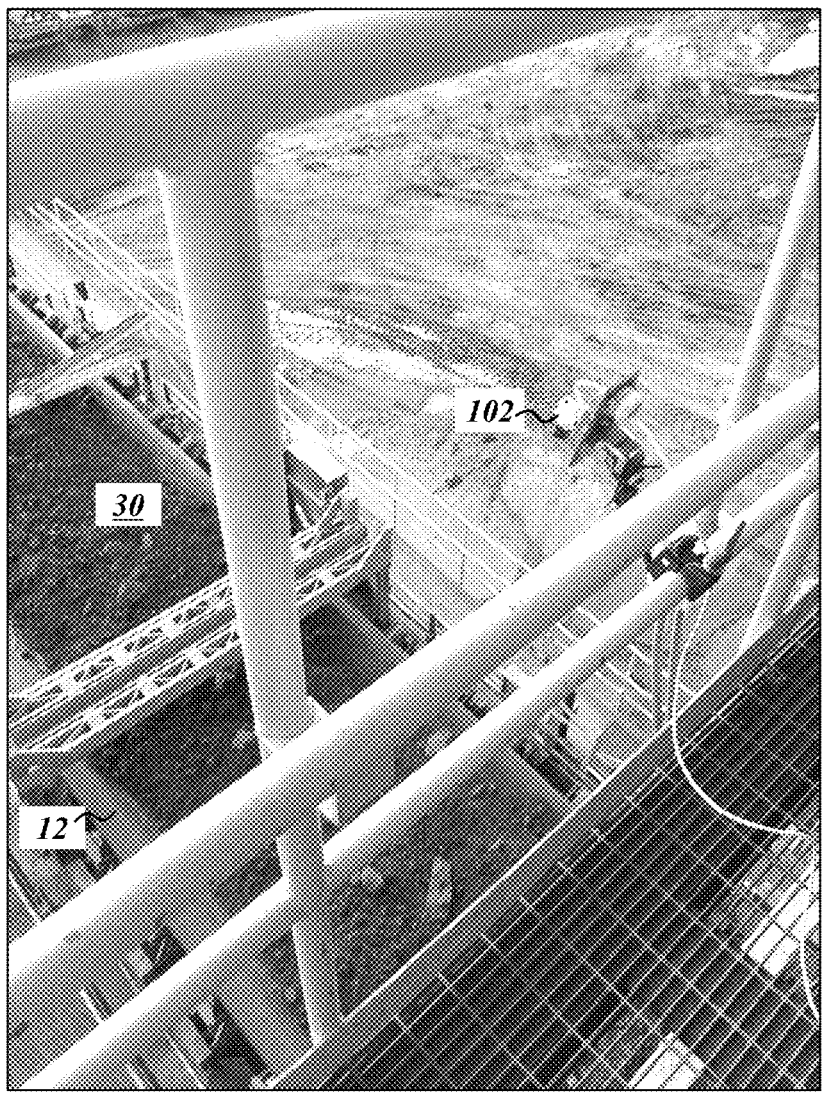
FIG. 2 shows a photograph of a set-up of a digital video camera in relation to a conveyor belt system, in an embodiment of a system of the present invention.

The digital video camera (102) may be a handheld mobile camera, a mobile camera removably mounted to a support such as a tripod, or a camera permanently installed in proximity to the conveyor belt (10). As a non-limiting example, FIG. 2 shows an embodiment of a system (100) having a single digital video camera (102) that is clamped to a handrail above the conveyor belt (12). Preferably, the digital camera (102) is mounted as close as possible to the conveyor belt (12) so that each pixel of the captured digital video frames corresponds to as small as possible of an actual distance of the captured object. This allows for greater accuracy in determining the transverse position of the conveyor belt (102) and the transverse position of the material load (30) on the conveyor belt (102). That being said, the high resolution capabilities of available digital video cameras may allow the digital video camera (102) to be positioned a few meters or more from the conveyor belt (102), while still allowing the system (100) to provide acceptable accuracy of results.

It is important that the digital video camera (102) be able to capture a clear digital video of the conveyor belt (12) and the material load (30) since the method of the present invention relies on segmentation of the captured digital video into a group of pixels representative of the conveyor belt (12), and a group of pixels representative of the material load (30). Therefore, the digital video camera (12) is preferably mounted in a location that is relatively free form dust and precipitation, free from vibration, and well lit. Vibration of the digital video camera (102) may be mitigated by mounting the digital video camera (102) to a well isolated structure. Vibrations captured by the digital video may also be corrected by hardware-based optical image stabilization mechanisms, and software-based digital image stabilization approaches, as known to persons skilled in the art of digital video cameras. Additional lighting may be provided to reduce or avoid shadows, and illuminate the conveyor belt (12) and the material load (30), if daylight is adequate to produce a sufficiently clear digital video.

The present invention is not limited by any particular specification of the digital video camera (102). However, the present invention is facilitated by a digital video camera (102) having a lens and image sensor that can produce clear digital images under a range of lighting conditions, and that can record at a high resolution suitable for processing as subsequently described in further detail. The required frame rate of the digital video is dictated by the desired frequency of monitoring. Accordingly, the frame rate need not be particularly high, and this helps to control the computational expense of the method. For example, in one embodiment, the digital video camera (102) may capture digital video at a frame rate of one frame per second (FPS), to allow for monitoring of the transverse position of the conveyor belt (12) at one second intervals. Alternatively, image frames may be acquired in high-speed bursts, for example 10 frames at 100 FPS every 10 seconds, to help with moving object detection and tracking by having image features move only small number of pixels between consecutive frames. Accordingly, those skilled in the art will appreciate that embodiments of the present invention may substitute the digital video camera (102) with a digital camera for capturing a succession of still digital images.

In one embodiment, such as shown in FIG. 2, the system (100) may comprise a single digital video camera (102). In one embodiment, the digital video camera (102) may be positioned so that its field of view includes only one of the edges of the conveyor belt (12). In this case, the method of the present invention can be used to determine the transverse alignment of the conveyor belt (12) with reference to one edge of the conveyor belt (12), and to determine the transverse position of the material load (30) in relation to the one edge of the conveyor belt (12). In an alternative embodiment, the digital video camera (102) may be positioned so that its field of view includes both edges of the conveyor belt (12). In this case, the method of the present invention can be used to determine the transverse alignment of the conveyor belt (12) with reference to both edges of the conveyor belt (12), and to determine the transverse position of the material load (30) in relation to both edges of the conveyor belt (12).

In another embodiment, such as shown in FIG. 1, the system (100) may comprise a pair of digital video cameras (102, 103). The use of two digital video cameras (102, 103) provides redundancy in case one of the digital video cameras (102, 103) becomes inoperable or is taken offline for maintenance, and other advantages as explained below. In one embodiment, the first digital video camera (102) may be positioned so that its field of view (110) includes only one of the edges of the conveyor belt (12), and the second digital video camera (103) may be positioned so that its field of view (111) includes only the opposite edge of the conveyor belt (12). In this case, the method of the present invention can be used to determine the transverse position of the conveyor belt (12) with reference to each of the edges of the conveyor belt (12) independently of each other. These independent determinations may be compared with each other to verify their accuracy, assuming that the transverse width of the conveyor belt (12) is constant and unaffected by phenomena such as warping or torsion. In an alternative embodiment, each of the digital video cameras (102, 103) may be positioned so that each of their fields of view (110, 111) includes both edges of the conveyor belt (12).

Display Device.

A purpose of the display device (104) is to receive data signals from the processor (106), and display the data signal in a human-readable format. In particular, the display device (104) is used to display reports or notifications generated by the processor (106) implementing a method of the present invention.

The present invention is not limited by any particular type of display device (104). In one embodiment as shown in FIG. 1, the display device (104) is a standalone computer monitor. In other embodiments, the display device (104) is a screen of a mobile computer such as a tablet computer of a smartphone.

Communication Port.

The output of the processor may sent through a communication port (107) to a Distributed Control System (320), an external database (322) for data storage, or used directly as an input for a computer-implemented system for correcting conveyor misalignment (324). As an example, the Distributed Control System (320) may be a plurality of computer devices that are collectively configured to control operation of the conveyor belt (12), or associated equipment for discharging the material load (30) on the conveyor belt (12).

Processor and Memory.

A purpose of the processor (106) is to implement a set of instructions stored on the memory (108) to carry out a method of the present invention for monitoring the transverse position of the conveyor belt (12), or the transverse position of the material load (30) thereon, or both of them.

The present invention is not limited by any particular type of processor (106) and memory (108). In one embodiment, the processor (106) and the memory (108) may be provided by a laptop or desktop general-purpose desktop computer including a processor (106) in the form of a CPU chip operatively connected to a memory (108) in the form of a hard drive disk, and running on an operating system such as Windows™ (Microsoft Corporation; Redmond, Wash., USA) or macOS™ (Apple Inc., Cupertino, Calif., USA).

Figure 3:
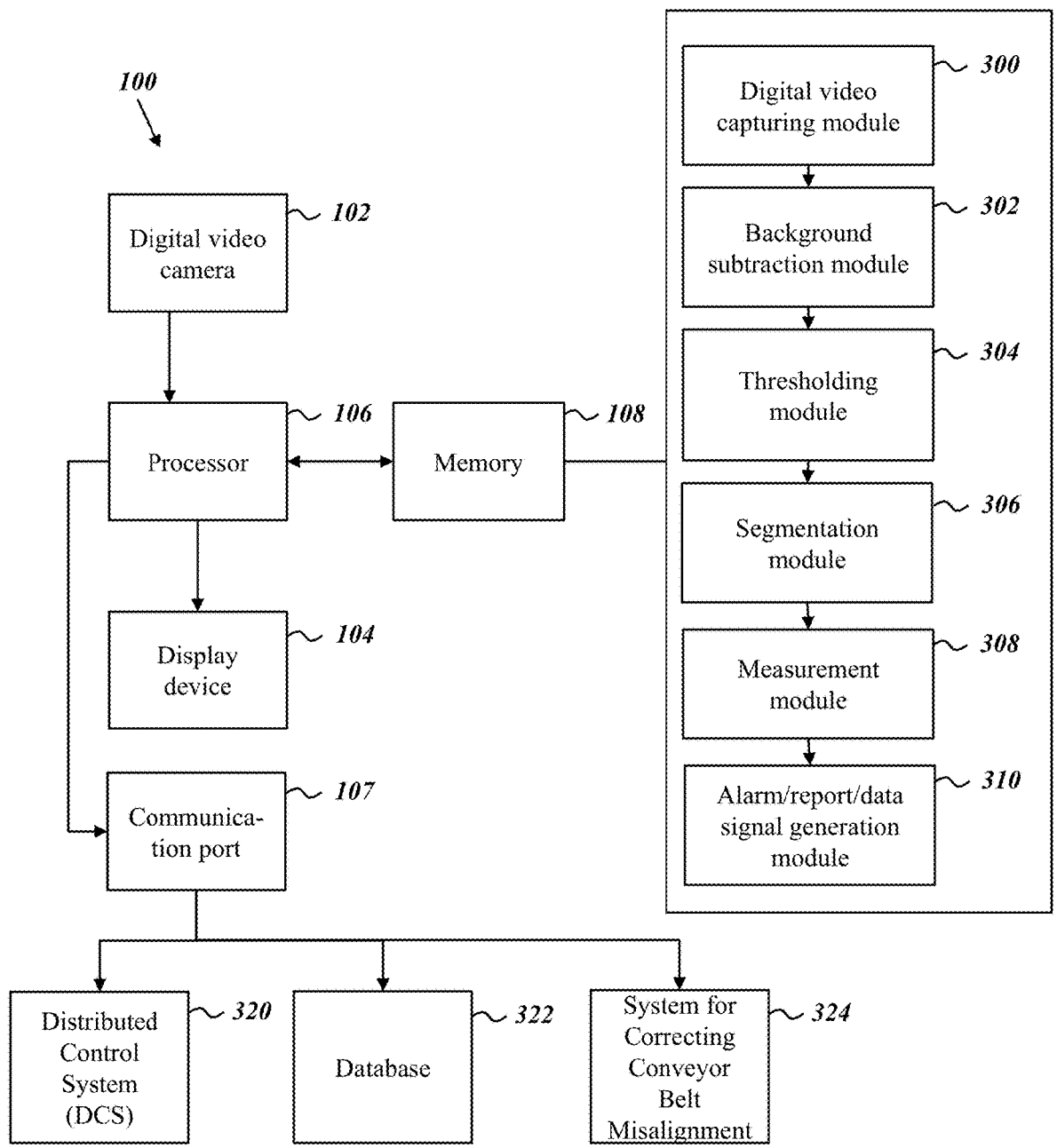
FIG. 3 shows a block diagram of the system of FIG. 1.

As shown in FIG. 3, the set of instructions stored by the memory (108) may be conceptualized as a set of modules (300 to 310), each of which represents part of the instructions that enable specific functions of the system (100). In one embodiment, the instructions may be coded in a computing environment such as MATLAB™, including the MATLAB Image Processing Toolbox™ (The MathWorks, Inc.; Natlick, Mass., USA), which provides a reference-standard algorithms and workflows for image processing, analysis, and visualization. The memory (108) storing the set of instructions may, by itself, form a computer-program product of the present invention.

Method.

Figure 4:
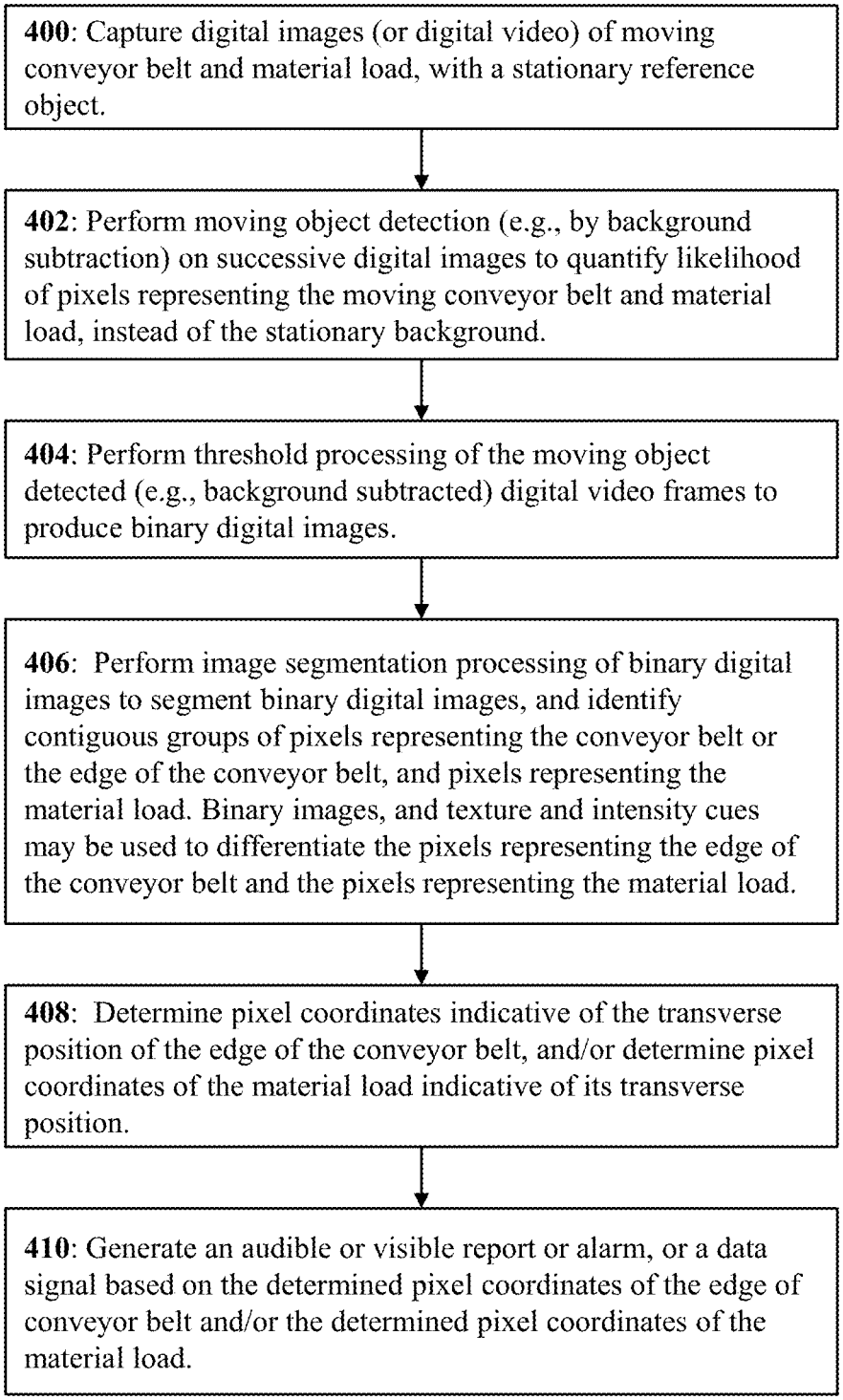
FIG. 4 shows a flow chart of steps in an embodiment of a method of the present invention for monitoring a conveyor belt.

FIG. 4 shows a flow chart of steps in an embodiment of a method of the present invention for monitoring the transverse position of the conveyor belt (12) and the material load (30) thereon, as may be implemented by the system (100) of the present invention. Although the embodiment of the method is described below as operating on digital video frames, those skilled in the art will appreciate that other embodiments of the present invention may operate on still digital images in an analogous manner.

Step 400: Capture Digital Video of Moving Conveyor Belt with Material Load

At step 400, the method begins with using the digital video camera (12) to capture digital video of the edge of the moving conveyor belt (12) and the material load (30), and a substantially stationary background. The background may be arbitrarily selected as any stationary object having a substantially constant appearance between successive frames of the digital video. In embodiment of the method, it is convenient to use the support structure (20) and the underlying ground surface of the conveyor belt system (12) as the background, since it typically includes one or more structural members in close proximity to the edge of the conveyor belt (12).

Figure 5:
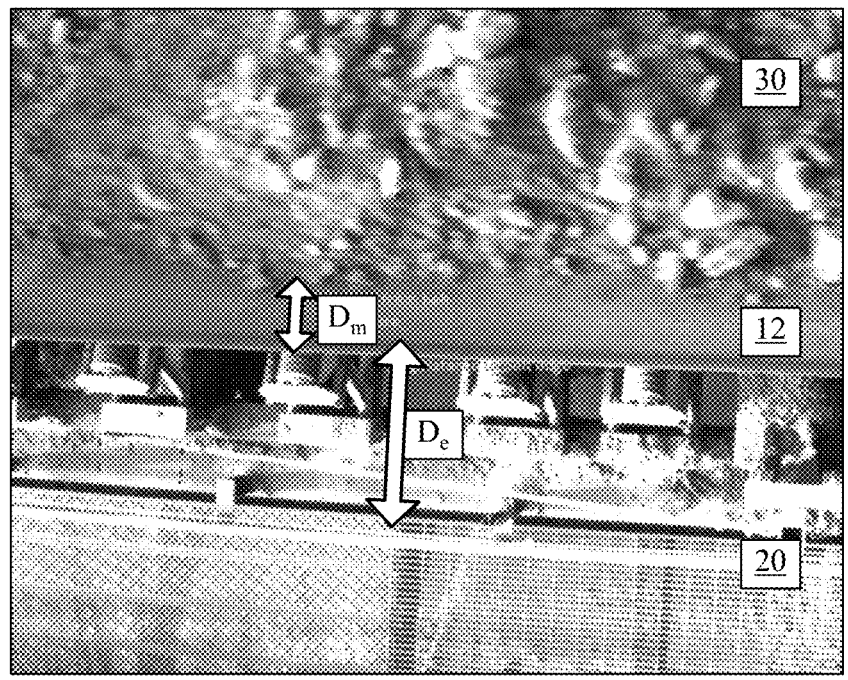
FIG. 5 is an exemplary digital video frame showing an edge of a conveyor belt carrying oil sand ore, as captured in an embodiment of a method of the present invention, and annotated with the pixel distance, $D_e$, between the support structure of the conveyor belt system and the edge of the conveyor belt, and the pixel distance, $D_m$, between the edge of the conveyor belt and the material loaded onto the conveyor belt.

FIG. 5 shows an example of a captured digital video frame. The digital video frame shows one of the edges of the conveyor belt (12), the material load (30) in the form of crushed oil sand ore, and the support structure (20) of the conveyor belt system (10) serving as the background. As shown in FIG. 5, there are two pixel dimensions of interest. The first pixel dimension of interest, $D_e$, is the pixel distance between the edge of the conveyor belt (12) and an arbitrary position (e.g., a point of the support structure (20)), which is used to determine the transverse position of the conveyor belt (12). The second pixel dimension of interest, $D_m$, is the pixel distance between the edge of the conveyor belt (12) and the material load (30) which is used to determine the transverse position of the material load (30).

In one embodiment, the digital video camera (102) may be manually operated. In other embodiments, the digital video camera (102) may be operated under control of a digital video capturing module (300), which may activate and de-activate the digital video camera (102) to initiate and end recording at certain times. In one embodiment, the captured digital video may be saved on a local memory device (e.g., a memory card) associated with the digital video camera (102) for subsequent "offline" analysis by the processor (106). In another embodiment, the captured digital video may be transmitted via a data signal to the processor (106) for processing in "real-time"—i.e., processing within a time of receiving the data signal that is, for all practical intents and purposes, concurrent with the capture of the digital video. In either case, the digital video shall be considered as being "received" by the processor (106).

Step 402: Perform Background Subtraction on Successive Digital Video Frames to Differentiate Between Pixels Representative of the Conveyor Belt, the Material Load, and the Stationary Background.

As discussed in relation to the subsequent step (406), the method of the present invention relies on segmentation processing of the digital video frames to differentiate between pixels that are representative of the representative of the stationary background (e.g., the support structure (20)) as opposed to the pixels that are representative of the conveyor belt (12) and the material load (30). As known to persons skilled in the art of the digital video processing, segmentation processing may be performed in accordance with a variety of known algorithms so as to assign different labels to different groups of pixels having one or more shared characteristics such as a color, luminous intensity, or perceived texture. Any segmentation processing approach may be suitably adapted for segmentation processing of the digital frames in embodiments of the method of the present invention In one embodiment, a background subtraction or motion-based segmentation is used to exploit the apparent motion of the conveyor belt (12) and the material load (30) between successive digital video frames, in contrast to the substantially static appearance of the background (e.g., the support structure (20) of the conveyor belt system (10)) between successive digital video frames. Provided that the digital video is captured with a relatively high frame rate (e.g., one frame per second), any variation in shadows and lighting between successive digital video frames is likely to be minimal, and will therefore also have a substantially static appearance between successive digital video frames.

Accordingly, in one embodiment, in step (402) (performed in accordance with the instructions of the background subtraction module (302)), the method continues by determining a difference in pixel values between successive digital video frames using a background subtraction approach. In one embodiment, the background subtraction approach uses a running Gaussian average of variation in pixel color values. This approach is known to persons skilled in the art of digital video processing, and does not by itself form part of the present invention.

Figure 6:
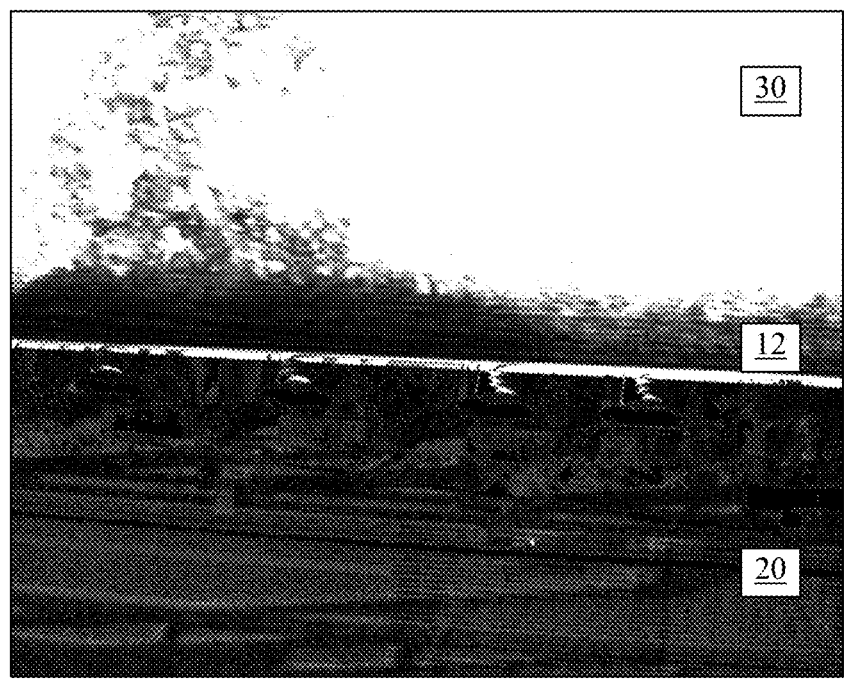
FIG. 6 shows the digital video frame of FIG. 5 after background subtraction processing.

FIG. 6 shows an exemplary digital video frame of FIG. 5 after background subtraction processing using the aforementioned running Gaussian average approach. In FIG. 6, the pixel intensity is indicative of the difference between pixel values between successive digital video frames. The pixels representative of most of the exposed portion of the conveyor belt (12) have a low pixel intensity (i.e., they appear as dark grey or black) since this embodiment of the conveyor belt (12) has a substantially smooth surface, which results in minimal variance in pixel values between successive digital video frames. However, the pixels representative of the edge of the conveyor belt (12) have high pixel intensity (i.e., they appear as an almost white or white line) since the edge of the conveyor belt (12) moves in a transverse direction against its background. The pixels representative of the material load (30) have high pixel intensity (i.e., they appear almost white or white) since the material load (30) is highly textured, resulting in a substantial variance in pixel values between successive video frames. The pixels representative of the support structure (20) and the underlying background have low pixel intensity (i.e., they appear as dark grey or black) since they appear substantially static between successive video frames, apart from the effect of minor vibrations. It will be understood that the different pixel intensities provide a quantitative measure of the likelihood of the pixel representing the moving conveyor belt (12), the edge of the conveyor belt (12), the material load (30), or the support structure (20).

In other embodiments of the present invention, the background subtraction process as described above may be substituted with other moving object detection techniques known in the art (e.g., frame differencing, and optical flow), that allow for quantifying the likelihood of the pixel representing the moving conveyor belt (12) or the edge of the conveyor belt (12), the material load (30) or the support structure (20).

As noted, in the example of FIG. 5, the conveyor belt (12) has a relatively smooth texture. Despite actual movement of the conveyor belt (12), its smoothness results in little apparent movement between successive digital video frames, such that the main part of the conveyor belt (12) appears dark grey or black in the segmented digital video frame of FIG. 6. In other examples, however, the conveyor belt (12) may be textured or have applied visual markings on its surface. In such cases, movement of the whole of the conveyor belt (12) (including its edge) may be more apparent from moving object detection. As such, the moving object detection will allow for identification of a group of contiguous pixels representative of the conveyor belt, in general.

Step 404: Perform Threshold Processing of the Background Subtracted Digital Video Frames to Produce Binary Digital Video Frames.

Referring to FIG. 6, it will be noted that the pixels in the vicinity of the exposed conveyor belt (12) and the material load (30) transition gradually from pixels with low intensity values to pixel with high intensity values. These pixels may create challenges for segmentation processing since they do not provide a distinct boundary between the conveyor belt (12) and the material load (30). However, it may reasonably be assumed that pixels with lower intensity values should be representative of the relatively smooth conveyor belt (12), while pixels with higher intensity values should be representatively of the more highly textured material load (30).

Accordingly, in one embodiment, in step (404) (performed in accordance with the instructions of the thresholding module (304)), the method continues by threshold processing of the digital video frames. A non-limiting example of suitable segmentation algorithm involves global thresholding. Such algorithms are known to persons skilled in the art of digital image processing, and do not by themselves form part of the claimed invention. In one embodiment, the global thresholding algorithm converts pixels having a luminous intensity greater than a single threshold value in FIG. 6 to white pixels in FIG. 7, and converts pixels having a luminous intensity less than the single threshold value in FIG. 6 to black pixels in FIG. 7.

Step 406: Perform Segmentation Processing of Binary Digital Video Frames to Segment Digital Video Frames into Contiguous Groups of Pixels Representing the Edge of the Conveyor Belt, and the Material Load.

Figure 7:
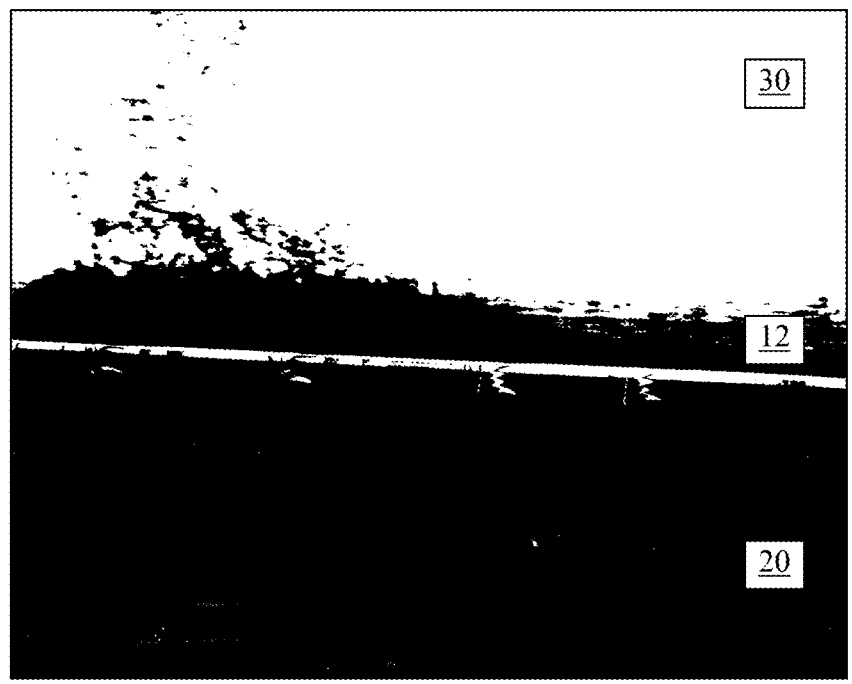
FIG. 7 shows the digital video frame of FIG. 6 after threshold processing.

Referring to FIG. 7, after threshold processing of the digital video frames, it will be noted that the top portion of the digital video frame includes a contiguous group of the white pixels. It may reasonably be assumed that these pixels are representative of the material load (30). Immediately below, the digital video frame includes a contiguous group of black pixels. It may reasonably be assumed that these pixels are representative of the exposed portion of the conveyor belt (12). Immediately below, the digital video frame includes a contiguous group of white pixels, forming a distinct line extending horizontally at an angle across the digital video frame. It may reasonably be assumed that these pixels are representative of the edge of the conveyor belt (12). Finally, the bottom portion of the digital video frame has a contiguous group of black pixels. It may reasonably be assumed that these pixels are representative of the stationary support structure (20) and the underlying background. These distinct features in the digital video frames may be used a basis for segmentation processing.

Figure 8:
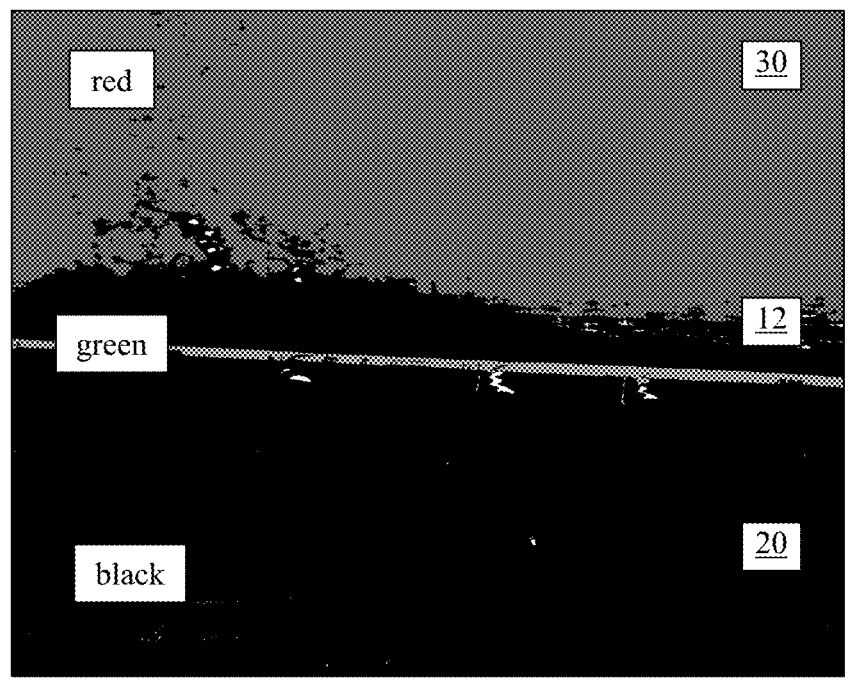
FIG. 8 shows the digital video frame of FIG. 7 after segmentation processing, with color coding to distinguish between the edge of the conveyor belt, and the material load.

Accordingly, in step (406) (performed in accordance with the instructions of the segmentation module (306)), the method continues by segmenting the digital video frames into a group of contiguous white pixels as representing the edge of the conveyor belt (12) and a group of continuous black pixels extending from the top of the digital video frame as representing the material load (30). FIG. 8 is actually an RGB image and shows the digital video frame of FIG. 7 after segmentation processing, with color coding to distinguish between the edge of the conveyor belt, and the material load. The pixels representative of the edge of the conveyor belt (12) are shown in green color. The pixels representative of the material load (30) are shown in red color. The remainder of the pixels are black in color, except for some relatively small isolated regions of white pixels.

As noted above, in other examples, step (402) may result in detecting movement of the conveyor belt (12) as a whole, as opposed to only the edge of the conveyor belt (12). In such examples, the conveyor belt (12) (including its edge) may be represented by pixels having a common color after segmentation processing.

Step 408: Determine Pixel Coordinates of the Edge of Conveyor Belt Indicative of its Transverse Position, and/or Determine Pixel Coordinates of the Material Load Indicative of its Transverse Position.

After step (406), the digital video frames have been segmented into a group of pixels representative of the edge of the conveyor belt (12), and a group of pixels representative of the material load (30).

Accordingly, in step (408) (performed in accordance with the instructions of the measurement module (208)), the method continues by determining pixel coordinates of the edge of conveyor belt (12) indicative of its transverse position, and/or determining pixel coordinates of the material load (30) indicative of its transverse position. These pixel coordinates may in and of themselves be useful for monitoring the transverse position of the edge of the conveyor belt (12) and the material load (30).

The pixel coordinates may be further analyzed to compute useful derived parameters such as the pixel distance, $D_e$, between an arbitrary point in the digital video frame and the group of pixels representative of the edge of the conveyor belt (12) (See FIG. 5), and the pixel distance, $D_m$, between the edge of the conveyor belt (12) and the material load (30) (See FIG. 5). Such pixel distances may be converted by a quantitative relationship into actual distance units (e.g., millimeters) by application of scaling factors between pixel distances and actual distance, as may be determined by calibration or by a rational relationship.

As noted above, in other examples, segmentation processing may result in the conveyor belt (12) as a whole (including its edge) being represented by pixels having a common color. In such examples, the pixel coordinates of the edge of the conveyor belt (12) may be determined by the boundary of such pixels.

Step 410: Generate an Audible or Visible Report or Alarm, or a Data Signal Based on the Determined Pixel Coordinates of the Edge of Conveyor Belt and/or the Determined Pixel Coordinates of the Material Load.

In step (410) (performed in accordance with the instructions of the alarm or report generation module (310)), the method concludes by generating a human-audible or human-readable alarm or report, or a data signal based on the value of the determined pixel coordinates of the edge of the conveyor belt (12) and/or the determined pixel coordinates of the material load (30).

Figure 9:
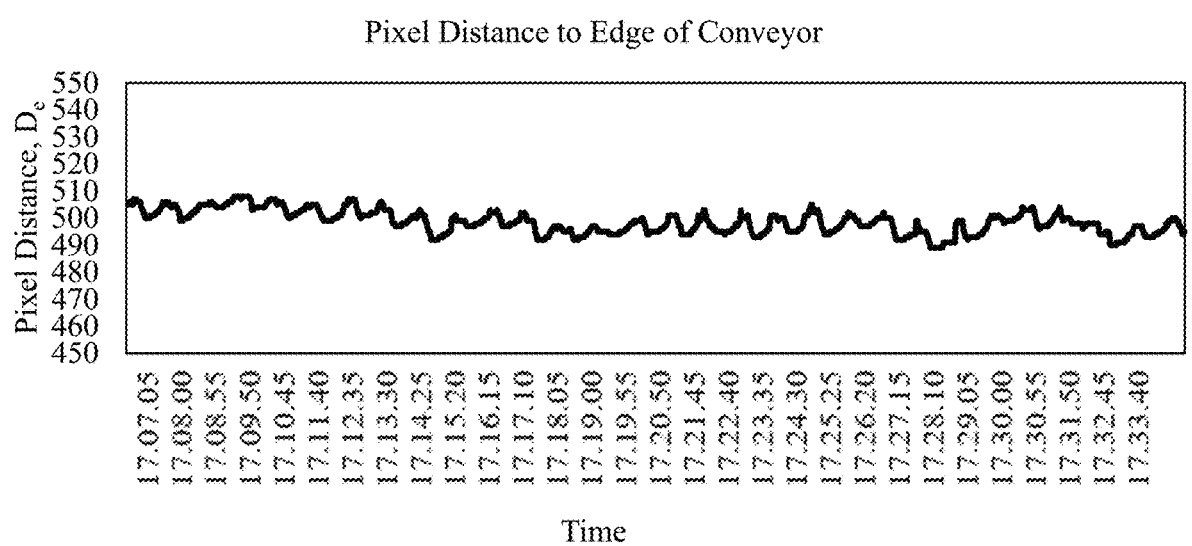
FIG. 9 shows a chart of the time varying pixel distance, $D_e$, between the support structure of the conveyor belt system and the edge of the conveyor belt, as determined by an embodiment of the method of the present invention.

FIG. 9 shows an example of a report, which may be generated by an embodiment of the method of the present invention on the display device (104). The report includes a chart showing the time varying pixel distance, $D_e$, between the support structure (20) of the conveyor belt system (10) and the edge of the conveyor belt (12), as determined by an embodiment of the method of the present invention. In this embodiment, the pixel distance, $D_e$, is monitored over a total time period of 27-minutes. The period of oscillations is about 55 to 59 seconds. The conveyor belt (12) that was monitored to produce the chart required 56 seconds to make a complete cycle. The consistency between the period of oscillations and the known periodicity of the conveyor belt supports the accuracy of the measurements. Similarly, a report may be generated to show the time varying pixel distance, $D_m$, between the edge of the conveyor belt (12) and the material load (30). Such information may assist an operator with diagnosing problems with the operator of the conveyor belt system (10), and making informed adjustments.

In other embodiments, the method may generate an audible alarm or a visual alarm based, directly or indirectly, upon the value of the pixel coordinates. For example if the determined pixel distances, $D_e$ or $D_m$, are outside of a predetermined threshold range, the method may generate an audible alarm on a speaker operatively connected to the processor (106) or a visible alarm on the display device (104). In this manner, the method may be used to alert an operator of the conveyor belt system (10) to transverse misalignment of the conveyor belt (12) or uneven distribution of the material load (30), and allow the operator to take appropriate corrective action in real-time.

In still other embodiments, the method may generate a data signal based, directly or indirectly, upon the value of the pixel coordinates. For example, the data signal may encode for the transverse position of the conveyor belt (12) and/or the material load (30). The data signal may serve as an input for an electronic actuator that shut downs the conveyor belt system (12) or steers the conveyor belt (12) back into proper transverse alignment based on the determined transverse position of the conveyor belt (12), or for an electronic actuator that adjusts a mechanism (e.g., an apron feeder or a hopper) that deposits the material load (30) on to the conveyor belt (12) based on the determined transverse position of the material load (30). The data signal may be sent to the Distributed Control System (320), or be used directly as input into a computer-implemented system for correcting conveyor belt misalignment (324). An example of such a system is described in the applicant's co-pending Canadian application no. 3,039,866, and corresponding U.S. application Ser. No. 16/379,369, the contents of which are incorporated by reference in their entirety, where permitted.

Interpretation.

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A method for monitoring a transverse position of a conveyor belt, the method implemented by a processor and comprising the steps of:
    (a) receiving at least one digital image of at least a portion of the conveyor belt;
    (b) for each digital image:
        (i) segmenting the digital image into a group of contiguous pixels representative of at least the portion of the conveyor belt; and
        (ii) determining a transverse pixel or actual distance between the portion of the conveyor belt and a stationary reference point, based on the group of contiguous pixels; and
    (c) generating either an alarm or report that is audible or visible to a human, or a data signal, wherein generation of the alarm, the report or the data signal, or a characteristic of the generated alarm, report or data signal depends, directly or indirectly, on the determined transverse pixel or actual distance.

2. The method of claim 1, wherein the receiving step (a) comprises receiving a time sequenced succession of digital images or digital video frames, and the segmenting step (b)(i) comprises performing moving object detection on the frame to differentiate the pixels representative of at least the portion of the conveyor belt from other pixels of the frame, based on apparent motion of at least the portion of the conveyor belt between successive digital images or digital video frames.

3. The method of claim 2, wherein the moving object detection comprises background subtraction.

4. The method of claim 2, wherein the segmenting step (b)(i) further comprises performing threshold processing on the digital image or digital video frame after the moving object detection.

5. The method of claim 1, wherein the segmenting step (b)(i) comprises one or a combination of pixel intensity-based segmentation, or image texture-based segmentation.

6. The method of claim 1, the portion of conveyor belt comprises an edge of the conveyor belt.

7. The method of claim 1, wherein the segmenting step (b)(i) comprises one or a combination of pixel intensity-based segmentation, or image texture-based segmentation.

8. A method for monitoring a transverse position of a material load on a conveyor belt, the method implemented by a processor and comprising the steps of:
    (a) receiving at least one digital image of the conveyor belt and the material load on the conveyor belt;
    (b) for each digital image:
        (i) segmenting the digital image into a group of contiguous pixels representative of the material load; and
        (ii) determining a pixel coordinate indicative of the transverse position of the material load, based on the group of contiguous pixels; and
    (c) generating either an alarm or report that is audible or visible to a human, or a data signal, wherein generation of the alarm, the report or the data signal, or a characteristic of the generated alarm, report or data signal depends, directly or indirectly, on the determined pixel coordinates.

9. The method of claim 8, wherein the receiving step (a) comprises receiving a time sequenced succession of digital images or digital video frames, and the segmenting step comprises performing moving object detection on the digital image or digital video frames to differentiate the pixels representative of the material load from other pixels of the frame, based on apparent motion of the material load between successive digital images or digital video frames of the digital video.

10. The method of claim 9, wherein the moving object detection comprises background subtraction.

11. The method of claim 9, wherein the segmenting step (b)(i) further comprises performing threshold processing on the frame after the moving object detection.

12. The method of claim 8, wherein step (b) further comprises determining a pixel distance or an actual distance between the material load and an edge of the conveyor belt, based on the determined pixel coordinate.

13. The method of claim 12, wherein in step (c), generation of the alarm, the report or the data signal, or the characteristic of the generated alarm, report or data signal depends, directly or indirectly, on the pixel distance or the actual distance between the material load and the edge of the conveyor belt.

* * * * *